United States Patent
Vlemmings et al.

(10) Patent No.: US 6,867,522 B1
(45) Date of Patent: Mar. 15, 2005

(54) ASYNCHRONOUS MACHINE

(75) Inventors: Johannes Vlemmings, Weil der Stadt (DE); Karl-Juergen Roth, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/600,481

(22) Filed: Jun. 20, 2003

(30) Foreign Application Priority Data

Jul. 4, 2002 (DE) .......................... 102 30 006

(51) Int. Cl.[7] .............................................. H20K 21/10
(52) U.S. Cl. ...................... 310/125; 310/211; 310/166; 310/167; 310/168; 310/170; 310/171
(58) Field of Search ................................ 310/125, 211, 310/166–171

(56) References Cited

U.S. PATENT DOCUMENTS

| | | | | |
|---|---|---|---|---|
| 4,829,205 A | * | 5/1989 | Lindgren | 310/166 |
| 5,512,792 A | * | 4/1996 | Bawin | 310/262 |
| 5,818,141 A | * | 10/1998 | Cho | 310/211 |
| 6,184,606 B1 | * | 2/2001 | Pyrhoenen | 310/182 |
| 6,278,211 B1 | * | 8/2001 | Sweo | 310/114 |

FOREIGN PATENT DOCUMENTS

| | | | | |
|---|---|---|---|---|
| DE | 199 55 050 A1 | | 6/2001 | |
| EP | 0548733 A2 | * | 12/1992 | H02K/5/132 |
| JP | 55-125064 | * | 9/1980 | H02K/5/132 |

* cited by examiner

*Primary Examiner*—Darren Schuberg
*Assistant Examiner*—Iraj A. Mohandesi
(74) *Attorney, Agent, or Firm*—Michael J. Striker

(57) ABSTRACT

A synchronous machine (10), in particular, for a starter-generator of an internal combustion engine, includes a stator, a rotor (22) having a rotor shaft (24), a stack of sheets (28), and squirrel cage (30) non-rotatably connected with the rotor shaft (24) and the stack of sheets (28). The squirrel cage (30) has a short circuit ring (36) on its opposite front ends, which is secured to an annular reinforcement element (40, 42). The reinforcement elements (40, 42) do not overlap adjacent, outer circumferential surfaces of the squirrel cage (32) or the short circuit rings (36).

14 Claims, 1 Drawing Sheet

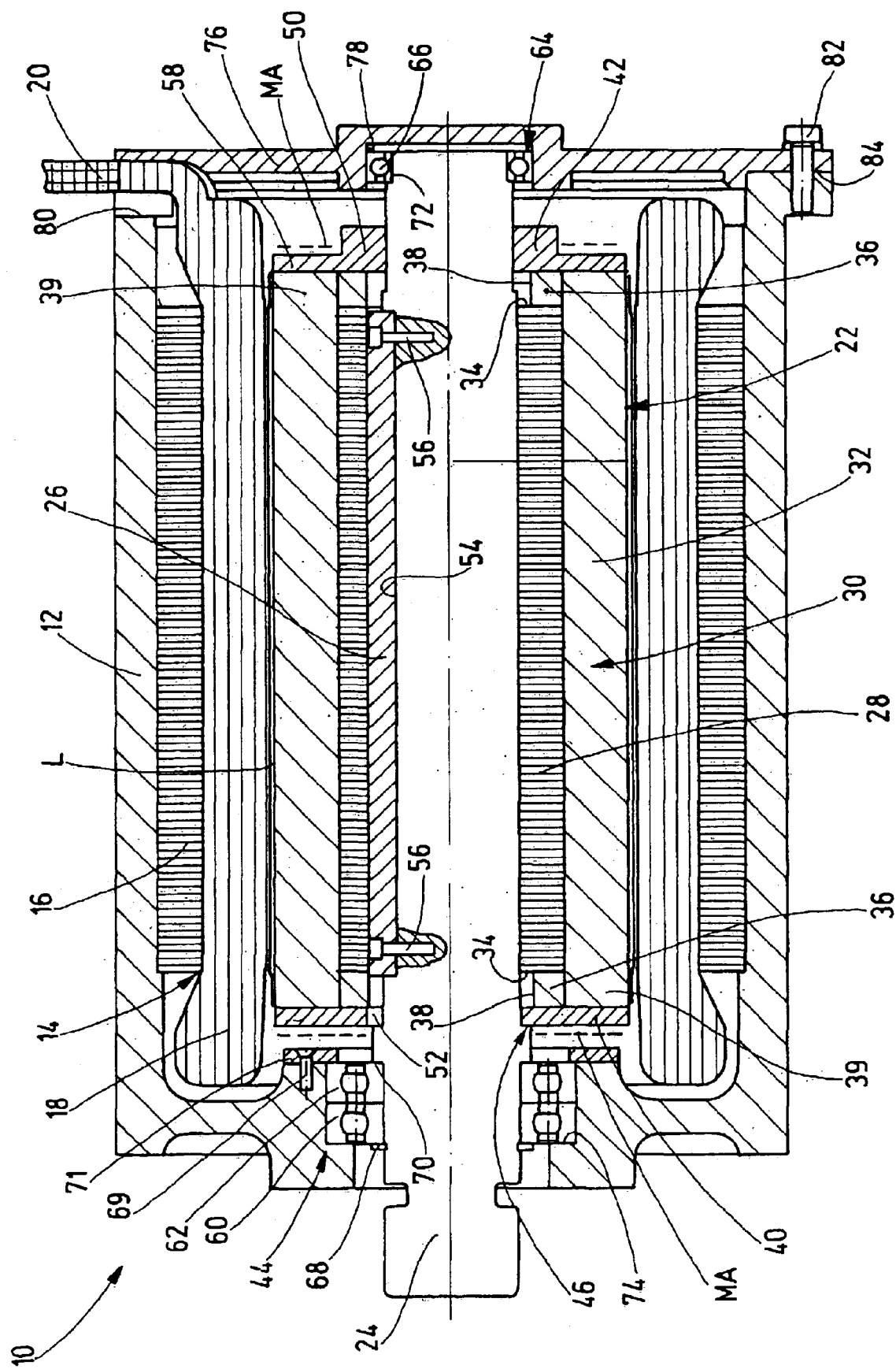

ASYNCHRONOUS MACHINE

BACKGROUND OF THE INVENTION

The present invention relates to an asynchronous machine for a starter-generator of an internal combustion engine.

Asynchronous machines of this type are of interest for many uses, such as, for example, machine tools, electric tools, or in the motor vehicle sector for hybrid drives, electrically-driven turbochargers, or starter-generators for internal combustion engines, which must be designed partly for very high maximum engine speeds.

If an asynchronous machine with a short circuit rotor is used as a starter-generator, in which the short circuit cage, or "squirrel cage" of the rotor is made as one-piece from aluminum die casting, the standards based on performance and efficiency frequently are not fulfilled, on account of which pure copper is used not infrequently as the cage material. This squirrel cage made of pure copper comprises generally cold-formed copper bars, which are inserted in receiving grooves of the stack of sheets of the rotor and are hard-soldered on their front ends, respectively, with one of two short circuit rings, which generally are either cast from copper or are stacked from multiple stamped copper sheets. As a result of the soldering of the short circuit bars with the short circuit rings, however, the physical properties of the copper material that is utilized are drastically decreased in the area of the solder points and around these points. As a result, with high speeds, the elastic limit of the material is exceeded, which leads to plastic deformation. This deformation takes the form of bowing out or warping, which begins in the inner diameter of the short circuit rings, and in extreme cases, can lead to tearing of the short circuit rings and to destruction of the asynchronous machine.

In order to make the rotors sufficiently speed-fixed, additional features are utilized, such as, for example, the mounting of so-called reinforcement rings made from a metal with high resistance, which encompasses the adjacent short circuit ring on its front side facing away from the stack of sheets, so that it outwardly supports the short circuit ring and absorbs a portion of the centrifugal forces acting on the short circuit ring with high speeds.

The Applicants' DE 199 55 050 A1 disdose such a reinforcement ring, which is attached with screws on the stack of sheets and has a circumferential groove open on one side in the axial direction, which accommodates the front end of the squirrel cage overlying the adjacent face surface of the stack of sheets with the short circuit ring. If this type of reinforcement ring is made from sheet metal, which has magnetic properties, this leads to a good magnetic inference for the stray field on the front end of the rotor, which results in an improper enlargement of the rotor dispersion and therewith, associated power losses of the asynchronous machine. Basically, these disadvantages could be avoided if a non-magnetic type of steel is used when manufacturing this type of reinforcement ring. However, this leads to significantly higher material costs and makes more difficult the mechanical machining of the reinforcement ring.

SUMMARY OF THE INVENTION

In contrast, the asynchronous machine of the present invention offers the advantage that with the both reinforcement elements opening to an air gap, a magnetic inference for the stray field on the front ends of the rotor can be avoided, so that the reinforcement elements can be manufactured from cost-effective, magnetic steel that is easier to machine, but which nevertheless enables sufficient protection against centrifugal force-related deformation of the short circuit rings. Stability analyses surprisingly have provided that the highest material demands occur on the inner diameter of the short circuit rings, which concurs with the observed forms of damage with warping or bending out of the short circuit rings beginning at the inner diameter. In order to prevent plastic deformation of the short circuit rings on these points of the highest material demand, according to the analyses of the present invention, it suffices that the reinforcement elements are mounted only in the area of the face surfaces of the short circuit rings and serve purely as axially supports of the short circuit rings.

In a preferred form of the present invention, it is provided that the reinforcement elements are flush on their outer circumference with adjacent, outer circumferential surfaces of the short circuit rings, while they can overlie on their inner circumference adjacent, inner circumferential surfaces of the short circuit rings, so that the entire face surface of the short circuit rings and in particular, the area of the highest material demand, is supported by the respective reinforcement element, without interfering with insertion of the rotor in the housing through the outer circumference of the front reinforcement ring.

According to a further preferred embodiment of the invention, the short circuit rings or squirrel cage are braced between the reinforcement elements, in which at least one of the reinforcement elements is pressed in the axial direction against the adjacent short circuit ring, so that also with high speeds, it cannot be pressed away in the event the yielding point of the copper in the short circuit ring should be exceeded in the area of the solder points.

This axial pressing of the reinforcement element can be ensured, for example, in that the reinforcement element between the short circuit bars of the squirrel cage is screwed, riveted, or welded with the stack of sheets of the rotor, or is shrunken on or pressed on or otherwise fixedly connected with the rotor stack of sheets. This also makes possible a balancing of the rotor by selective material removal of the reinforcement elements, since these are coupled non-rotatably with the stack of sheets by the fixed connection.

Advantageously, the two reinforcement elements additionally serve for axially fixing the stack of sheets and the squirrel cage on the rotor shaft. The reinforcement elements contacting the front sides of the short circuit ring, after sliding on the stack of sheets and the squirrel case onto the rotor shaft, perferably support the front element against an annular shoulder of the rotor shaft, while the rear element is fitted by shrinking or pressing on the rotor shaft.

In order to facilitate the manufacture of the reinforcement elements and to minimize the material costs as much as possible, the reinforcement elements perferably are made from commercial magnetic steel, whose tensile strength and bending strength exceed that of the copper to a sufficient extent.

BRIEF DESCRIPTION OF THE DRAWINGS

FIG. 1 shows a longitudinal sectional view of an asynchronous machine.

DETAILED DESCRIPTION OF THE PREFERRED EMBODIMENTS

The asynchronous machine 10 shown in FIG. 1 and embodied as a short circuit motor or squirrel cage motor comprises essentially a stationary housing 12, a support or stator 14 with a stator or support stack of sheets 16 and a stator or support coil 18, which supplies a three-phase rotating current via a connection cable 20. In the housing 12, an armature of the rotor 22 is rotatably supported, which essentially comprises a rotor shaft 24 overlying a front housing end, a stack of sheets 28 non-rotatably connected with the rotor shaft 24 by means of a fit-in key 26, as well as a squirrel cage 30 forming the armature coil. The stator 14 and the rotor 22 are separated by an air gap L.

The squirrel cage 30 of the rotor 22 comprises a plurality of short circuit bars 32, which penetrate the axially oriented grooves (not visible) of the armature stack of sheets 28 and which are fixedly connected on their opposite front ends overlying the front faces 34 of the stack of sheets 28 to a short circuit ring 36. The short circuit bars 32 comprise cold-formed copper and are inserted with their front ends in axial recesses of copper rings 36 cast from copper or formed in layers from stamped copper sheets, before they are connected with them by hard-soldering. Both short circuit rings 35 rest against the adjacent front surfaces 34 of the stack of sheets 28 and are arranged with their inner circumferential surfaces 38 at a radial distance from the adjacent circumferential surface of the rotor shaft 24. Since the physical properties of the copper material of the short circuit bars 32 and the short circuit rings 36 are drastically impaired as a result of the solders in the area of the solder points 39, the rotor 22 is provided with two reinforcement elements in the form of contact or pressure discs 40, 42, which are pressed from opposite sides against the flat front surfaces, which face away from one another, of the two short circuit rings 36. Both contact discs 40, 42 are limited in the axial direction by flat front surfaces, while they are limited in the radial direction by inner, cylindrical circumferential surfaces resting against the rotor shaft 24 or an outer, cylindrical circumferential surface that is flush with the outer circumferential surfaces of the short circuit rings 36 and the stack of sheets 28.

Both contact disks 40, 42 overlie somewhat radially inward the inner circumferential surface of the adjacent short circuit ring 36 and are made from common, non-alloyed, magnetic steel. Since they do not overlap the two short circuit rings 36 outwardly in the radial direction, a magnetic inference from the stray field on the front end of the rotor 22 can be avoided, in spite of the use of this type of material, and therewith, an enlargement of the rotor dispersion and the power loss of the asynchronous machine 10 connected therewith can be prevented.

While the front contact disk 40 adjacent to a front housing end is placed with play on the rotor shaft 24 until it braces against an annular shoulder 46 of the rotor shaft 35 behind the sheet stack 28 in the area of a front rotational bearing 44 of the rotor shaft 24, formed as a fixed bearing, the rear contact disk 42 is mounted non-rotatably and axially non-displaceable on the rotor shaft 24, whereby it presses the stack of sheets 28 with a prescribed pressing force in the direction of the front contact disk 40, so that it is braced between the two contact disks 40, 42. The mounting of the rear contact disk 42 can take place by means of pressing on or shrinking on onto the rotor shaft, whereby in the latter case, the contact disk 42 is re-pressed after cooling off with a prescribed pressing force axially in the direction of the contact disk 40, in order to provide sufficient bracing of the stack of sheets 28. By the play-free arrangement of the two contact disks 40, 42 against the respective, adjacent front surface of the squirrel cage 30, the stack of sheets 28 is fixed with the squirrel cage 30 non-displaceably in the axial direction with reference to the fit-in key 26.

In order to permit a secure seating of the rear contact disk 42, this disk 42 has an axially overlying ring-shaped projection 50 with a smaller outer diameter for enlargement of the contact surface between its inner circumferential surface and the circumferential surface of the rotor shaft 24 on its rear front side.

The front and rear contact disks 40, 42 can be screwed, riveted, or welded to the stack of sheets 28, so that they can be mounted together with the stack of sheets 28 and the squirrel cage 30 onto the rotor shaft 24. In this case, the front contact disk 40 is provided on its inner circumference at one point with a receptacle 52, so that it can be shifted over the fit-in key 26, which before the mounting of the stack of sheets 28 and the squirrel cage 30, is inserted in an axial groove 54 of the rotor shaft 24 and is attached with a screw 56 in the front and back.

In addition, a fixed, non-rotatable connection between the contact disks 40, 42 on the one hand, and the stack of sheets 28 with the squirrel cage 30 on the other hand, has the advantage that the rotor 22 can be balanced before insertion into the housing 12 by means of selective material reduction MA on the front sides of the contact disks 40 facing away from one another, which is shown in dashed lines. With the rear contact disk 42, the material reduction takes place on a part 58 of the contact disk 42 overlying the ring-shaped projection 50 outwardly in the radial direction.

The front rotational bearing 44 for the rotor 22 is formed from a bearing assembly comprising two roller bearings 60, 62 in the area of the front end of the rotor shaft 24, while a rear rotational bearing 64, formed as a floating bearing, is made up of a single roller bearing 66 on the back end of the rotor shaft 24. The two roller bearings 60, 62, placed from the forward direction onto the rotor shaft 24 are secured by a safety ring 68 against an annular shoulder 70 of the rotor shaft 24 resting on the rotor shaft 24. A retaining ring 71 screwed with attachment screws 69 from the inside to the housing 12 serves as a reverse fixing of the fixed bearing 60, 62. The roller bearing 66 is pressed from behind until contacting an annular shoulder 72 of the rotor shaft 24 on its back end after the mounting of the stack of sheets 28 with the squirrel cage 30.

After the balancing of the rotor 22, the rotor is inserted with the front roller bearings 60, 62 and the rear roller bearing 66 into the housing 12, until the outer ring of the front-most roller bearing rests again an annular shoulder 74 of the housing 12. Subsequently, the open back end of the housing 12 is closed by a bearing cover 76, which is provided on its inner side with a cylindrical seat 78 for the roller bearing 66. To balance a different heat strain of the housing 12 and the rotor shaft 24, a corrugated spring washer (not shown) is provided between the outer ring of the back roller bearing 66 and the bearing cover 76 within the seat 78. After feeding through the connection cable 20 through a side opening 80 between the housing 12 and the bearing cover 76, the latter is screwed tightly with multiple attachment screws 82 on an adjacent, overlying annular flange 84 of the housing 12.

It will be understood that each of the elements described above, or two or more together, may also find a useful application in other types of constructions differing from the types described above.

While the invention has been illustrated and described herein as a lubricating device with pressure equalization, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. An asynchronous machine for a starter-generator of an internal combustion engine, comprising a stator and a rotor, wherein the rotor includes a rotor shaft, a stack of sheets, and a squirrel cage non-rotatably connected with the rotor shaft and the stack of sheets, wherein the squirrel cage has a short circuit ring on each opposite front end, wherein each said short circuit ring is secured with an annular reinforcement element, wherein the reinforcement elements do not overlap adjacent, outer circumferential surfaces of the squirrel cage or the short circuit rings, and wherein the stack of sheets is supported with the squirrel cage between the reinforcement elements.

2. The asynchronous machine according to claim 1, wherein the outer circumferential surfaces of the reinforcement elements and adjacent outer circumferential surfaces of the squirrel cage or the short circuit ring are flush with one another.

3. The asynchronous machine according to claim 1, wherein the short circuit rings are made from copper and are connected by solders with short circuit bars made of copper to the squirrel cage.

4. The asynchronous machine according to claim 1, wherein at least one of the reinforcement elements are pressed on in an axial direction against an adjacent short circuit ring.

5. The asynchronous machine according to claim 1, wherein at least one of the reinforcement elements is screwed, welded, or riveted with the stack of sheets of the rotor.

6. The asynchronous machine according to claim 1, wherein one of the reinforcement elements is mounted with play on the rotor shaft and is braced against an annular shoulder of the rotor shaft.

7. The asynchronous machine according to claim 1, wherein one of the reinforcement elements is shrunken onto the rotor shaft.

8. The asynchronous machine according to claim 1, wherein that one of the reinforcement elements is pressed onto the rotor shaft.

9. The asynchronous machine according to claim 1, wherein the reinforcement elements overlie radially inward an inner circumferential surface of the short circuit ring.

10. The asynchronous machine according to claim 1, wherein at least one of the reinforcement elements is a cylindrical disk with a through-opening for the rotor shaft, wherein said cylindrical disk is limited by two flat front surfaces.

11. The asynchronous machine according to claim 1, wherein the reinforcement elements comprise magnetic steel.

12. The asynchronous machine according to claim 1, wherein at least one of the reinforcement elements is machined for balancing of the rotor by selective material reduction.

13. The asynchronous machine according claim 12, wherein the at least one reinforcement element is machined on a front side facing away from an adjacent short circuit ring by material reduction.

14. The asynchronous machine according to claim 1, wherein the stack of sheets is supported with the short circuit rings between the reinforcement elements.

* * * * *